Patented Oct. 23, 1945

2,387,702

UNITED STATES PATENT OFFICE 2,387,702

METHOD OF PREPARING ALPHA-NAPHTHYLMETHYL CHLORIDE

Charles E. Funk, Jr., Cos Cob, Conn., assignor to American Cyanamid Company, New York, N. Y., a corporation of Maine No Drawing. Application April 4, 1942, Serial No. 437,680

2 Claims. (Cl. 260—651)

This invention relates to a method of preparing alpha-naphthylmethyl chloride.

This compound is of value as an intermediate in the synthesis of alpha-naphthylacetic acid, the latter being particularly useful as a plant growth promoter and for initiating root formation.

A known method of preparing alpha-naphthylmethyl chloride consists in heating a mixture of naphthalene, aqueous formaldehyde, concentrated hydrochloric acid and sulfuric acid at a temperature between 60 and 70° C., cooling the mixture and adding an equal volume of water. Separation into 2 layers takes place, one being the product as an oily layer. This procedure involves the removal and disposal of a large volume of a highly acid water layer.

A principal object of the present invention is the provision of a novel, economical and convenient method for preparing alpha-naphthylmethyl chloride. A further object is to provide a method for the preparation of alpha-naphthylmethyl chloride wherein the use of an aqueous media and particularly aqueous mineral acids is avoided. Other objects will become apparent as the description of the invention proceeds.

These objects may be accomplished by introducing hydrogen chloride gas into a fused mixture of naphthalene and paraformaldehyde.

The reaction which takes place may be expressed by the following equation:

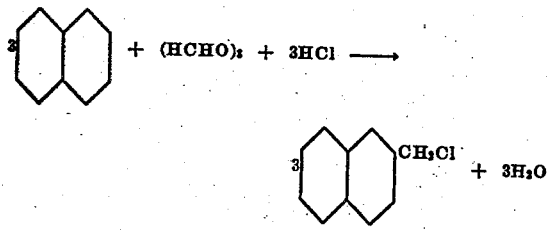

In carrying out the process a mixture consisting of about 3 mole equivalents of naphthalene and one mole equivalent of paraformaldehyde (a solid polymer of formaldehyde) is placed in a reaction vessel provided with suitable heating means. The mixture is heated to about 80° C. and held approximately at the same temperature during the run. Dry hydrogen chloride gas is passed into the fused mass until the reaction mixture becomes clear and remains clear on cooling to room temperature, thereby indicating the relative absence of unreacted ingredients. The hydrogen chloride gas is introduced in slight excess, the latter serving to carry off a greater portion of the water formed in the reaction. The alpha-naphthylmethyl chloride is obtained as a light colored oil and may be freed of impurities by distillation in vacuum.

It is preferable that the temperature of the reaction mixture be held within the range of 75 to 85° C. while introducing the hydrogen chloride gas. Operating at lower temperatures may result in freezing of the mixture, whereas at higher temperatures an excessive loss of the paraformaldehyde may take place. During normal operation an excess of about 20% of the paraformaldehyde should be used to compensate for volatilization losses.

The invention will be illustrated in greater detail by the following specific example. Parts indicated are by weight.

Example

A mixture consisting of 512 parts of naphthalene and 144 parts of paraformaldehyde is placed in a glass-lined reaction vessel equipped with a stirring device, an inlet tube for the introduction of hydrogen chloride gas and a vent for the escape of unreacted gas. After heating the charge to about 81° C., dry hydrogen chloride gas is passed in at such a rate that a slight excess passes from the reaction vessel. The reaction mixture is stirred and held between 80 and 82° C. during the run. A greater portion of the water formed in the reaction is carried away from the charge by the excess stream of hydrogen chloride gas. Introduction of the gas is discontinued when the charge becomes a clear liquid. The product is removed from the reaction vessel, cooled to room temperature and dried.

A simple and convenient method is available for the production of alpha-naphthylmethyl chloride.

While the invention has been described with particular reference to specific embodiments, it is to be understood that it is not to be limited thereto but is to be construed broadly and restricted solely by the scope of the appended claims.

I claim:

1. The method of preparing alpha naphthylmethyl chloride, which comprises introducing an excess amount of substantially dry HCl gas into a fused mixture consisting of naphthalene and paraformaldehyde maintained at a temperature within the range of 75° to 85° C. to form alpha naphthylmethyl chloride and water, and to sweep the major portion of the water from the reaction zone.

2. The method of claim 1 in which the fused mixture consists of three mol equivalents of naphthalene and one mol equivalent of paraformaldehyde.

CHARLES E. FUNK, Jr.